June 22, 1926.

W. CZARSKI

SIFTER

Filed Dec. 15, 1925   2 Sheets-Sheet 1

1,589,945

Inventor
William Czarski

June 22, 1926.

W. CZARSKI

SIFTER

Filed Dec. 15, 1925  2 Sheets-Sheet 2

1,589,945

Inventor
William Czarski

Patented June 22, 1926.

1,589,945

UNITED STATES PATENT OFFICE.

WILLIAM CZARSKI, OF ANCHORAGE, TERRITORY OF ALASKA.

SIFTER.

Application filed December 15, 1925. Serial No. 75,649.

This invention relates to improvements in flour sifters and the like and has for its object to provide a combined container and sifter, and means for closing the bottom thereof.

Another object of the invention is to provide a flour sifter having means whereby it may be held and actuated by one hand of the user.

A further object of the invention is to provide a flour sifter having a bottom intermediate of its ends and a sifter suspended under said bottom, and manually controlled means for sifting the flour without the necessity of shaking the sifter.

With the above and such other objects as may hereinafter more fully appear, I have invented the device illustrated in the accompanying drawings, in which.

Figure 1:
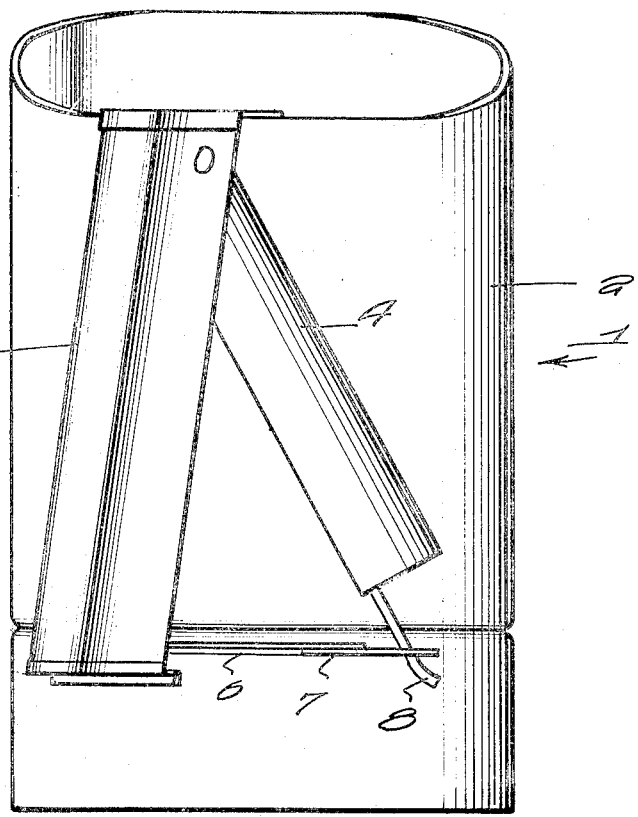
Figure 1 is an elevational view of my improved sifter.
Figure 2:
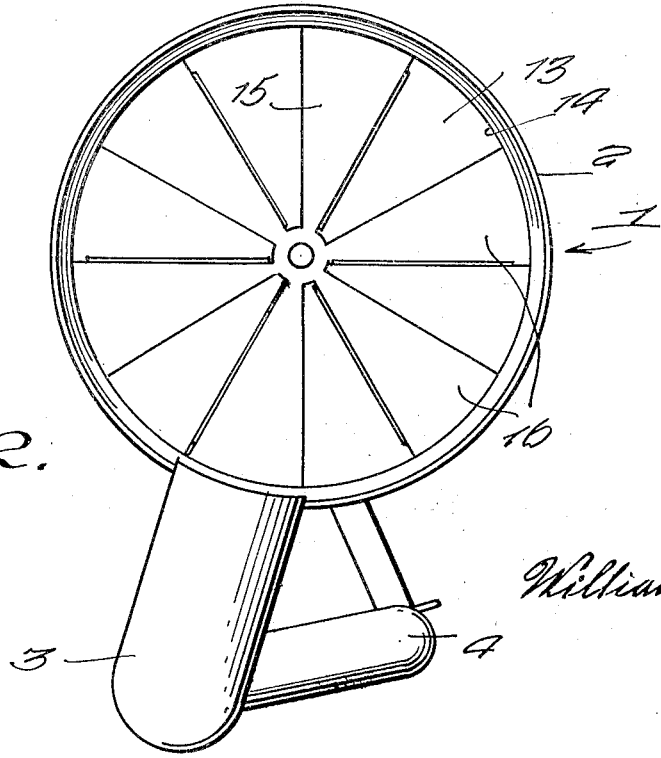
Figure 2 is a top plan view thereof.
Figure 3:
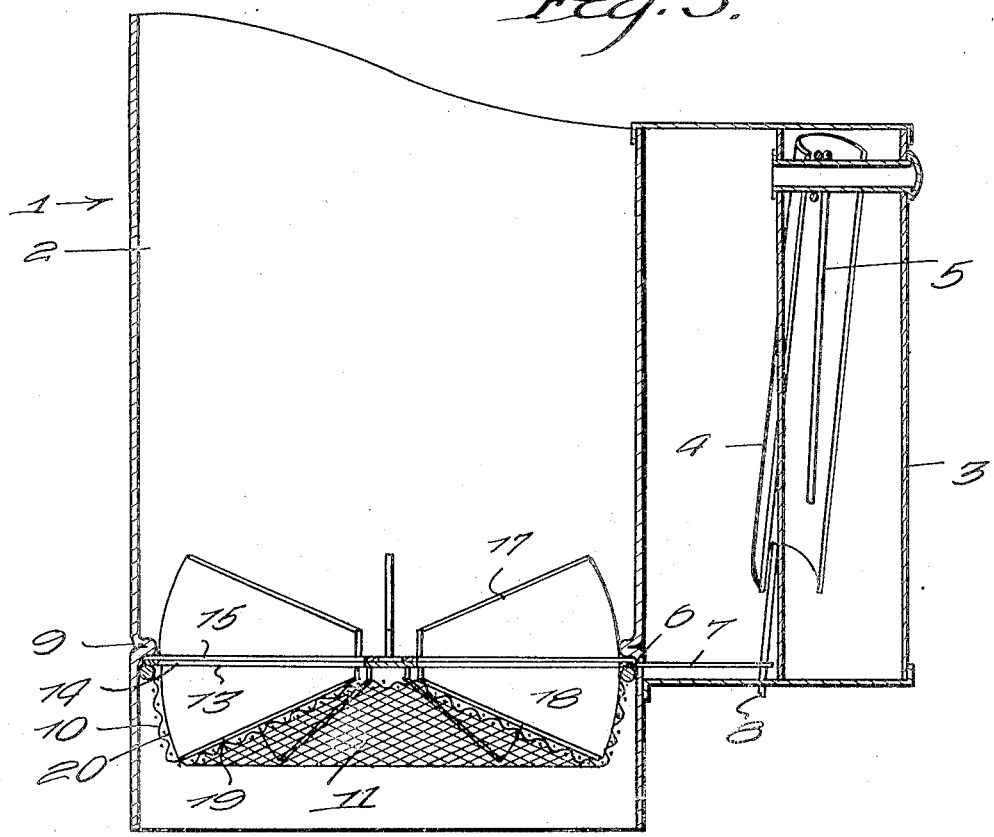
Figure 3 is a vertical sectional view of the device.
Figure 4:
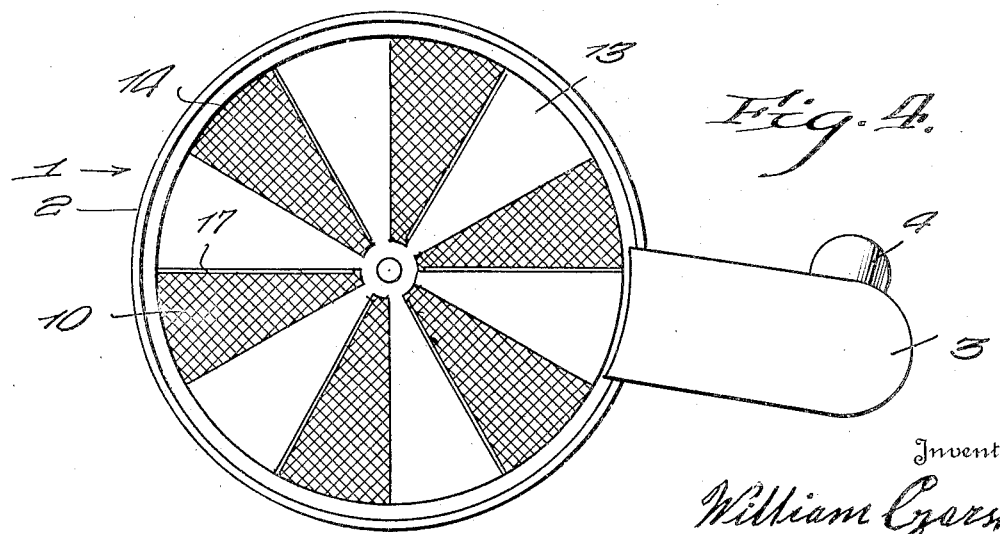
Figure 4 is a view similar to Figure 2, certain parts being in changed position.

Like reference characters indicate like parts throughout the following specification and in the several views in the drawings, in which 1 indicates a sifter consisting of a cylinder 2 having a handle 3, to the upper end of which is pivotally connected a finger-actuated member 4 held normally in extended position by means of a spring 5. Projecting through a horizontal slot 6 in the lower portion of the cylinder 2 is a lever 7 having an opening through which the rod 8 carried by the member 4 movably projects, whereby the lever 7 will be reciprocated through the movement of the member 4. Suspended within the cylinder 2 by means of a horizontal bead 9 is a dish-shaped sieve 10 having a conical bottom 11. Mounted upon the upper edge 12 of the member 10 is a bottom 13 provided with a series of spaced apart flaring openings 14. Rotatably seated upon the bottom 13 and actuated by means of the lever 7 is a shutter 15 having a series of spaced-apart shutter members 16 of a shape to close the openings 14 in one position of the member 15. Projecting upwardly from one edge of the sections 16 are agitators 17, and projecting downwardly from the other edge of said sections are similar members 18, the side and bottom edges 19 and 20 of which are of a contour to fit snugly the bottom and side walls of the sieve 10, whereby, upon the rotation of the member 15, the flour on the sieve will be forced therethrough. The agitators 17 operate directly under the flour in the cup or cylinder, thus keeping the flour from packing and causing a certain amount thereof to pass through the openings 14 during the reciprocation of the member 15.

From the above description, it will be seen that I have provided a sifter for flour or other material which may be held by its handle in the hand of an operator whose fingers may be contracted and relaxed, which action, with the co-action of the spring 5, will cause the backward and forward movement of the lever actuated member 4, whereby the shutter 15 will be rotated in a reciprocal manner, causing the flour to be agitated and sifted.

Having described my invention, that which I claim as new and desire to procure by Letters Patent is:

1. In a sifter having a horizontal wall with openings therein, a sieve mounted under said wall, and means for causing the contents of the sifter to pass through said openings into said sieve and agitating the flour upon said sieve, said means consisting of a rotatable shutter on said wall.

2. In a sifter having a horizontal wall with openings therein, a sieve mounted under said wall, and means for causing the contents of the sifter to pass through said openings into said sieve and agitating the flour upon said sieve, said means consisting of a rotatable shutter on said wall, and means for causing the rotation of said shutter.

3. In a sifter having a horizontal wall with openings therein, a sieve mounted under said wall, means for causing the contents of the sifter to pass through said openings into said sieve and agitating the flour upon said sieve, said means consisting of a rotatable shutter on said wall, and means for causing the rotation of said shutter, said means being manually controlled.

4. In a sifter having a horizontal wall with openings therein, a sieve mounted under said wall, means for causing the contents of the sifter to pass through said openings into said sieve and agitating the flour upon said sieve, said means consisting of a rotatable shutter on said wall, and means for causing the rotation of said shutter, said means being manually controlled and consisting of a pivotally mounted shutter-actuated member.

5. In a sifter having a horizontal wall with openings therein, a sieve mounted under said wall, means for causing the contents of the sifter to pass through said openings into said sieve and agitating the flour upon said sieve, said means consisting of a rotatable shutter on said wall, means for causing the rotation of said shutter, said means being manually controlled and consisting of a pivotally mounted shutter-actuated member, and a spring for maintaining said member in a normal position.

6. In a sifter having a horizontal wall with openings therein, a sieve mounted under said wall, means for causing the contents of the sifter to pass through the openings into said sieve and agitating the flour upon said sieve, said means consisting of a rotatable shutter on said wall, means for causing the rotation of said shutter, said means being manually controlled and consisting of a pivotally mounted shutter-actuated member and a spring for maintaining said member in a normal position, said member having a lever projecting through a slot in the wall of said sifter and engageable by said pivoted member.

7. A sifter comprising a body having a bottom with openings therein, a shutter controlling the openings, a screen below the shutter, blades on the shutter engaging the screen and means for operating the shutter.

8. A sifter comprising a body having a bottom with openings therein, a shutter controlling the openings, a screen below the shutter, blades on the shutter engaging the screen, a handle connected with the body, an arm pivoted to the handle and adapted to be actuated by the fingers of the hand grasping the handle and means for connecting the arm to the shutter.

9. A sifter comprising a body having a bottom with openings therein, a shutter controlling the openings, a screen below the shutter, blades on the shutter engaging the screen, upwardly extending blades on the shutter passing through the openings in the bottom, a handle on the body, an arm pivoted to the handle, and means for connecting the lower end of the arm with the shutter.

10. In a sifter a sieve and means for supporting the bulk of material being sifted from the sieve, said means including a shutter, agitators carried by the shutter.

11. In a sifter a sieve and means for supporting the bulk of material being sifted from the sieve, said means including a shutter, agitators carried by the shutter, a wall above the sieve.

12. In a sifter a sieve and means for supporting the bulk of material being sifted from the sieve, said means including a shutter, agitators carried by the shutter, a wall above the sieve, said agitators operating above and below the wall.

In testimony whereof I affix my signature.

WILLIAM CZARSKI.